United States Patent
Dairon et al.

(10) Patent No.: US 7,588,090 B2
(45) Date of Patent: *Sep. 15, 2009

(54) DEVICE FOR FIXING BLADES TO END PLATES WHICH ARE ROTATIONALLY INTEGRAL WITH A ROTARY SHAFT AND AGRICULTURAL MACHINE FITTED WITH SAID DEVICE

(75) Inventors: Michel Dairon, Pruille l'Eguille (FR); José Loyer, Allonnes (FR)

(73) Assignee: Dairon S.A.S., Mulsanne (FR)

( * ) Notice: Subject to any disclaimer, the term of this patent is extended or adjusted under 35 U.S.C. 154(b) by 911 days.

This patent is subject to a terminal disclaimer.

(21) Appl. No.: 10/528,792

(22) PCT Filed: Sep. 16, 2003

(86) PCT No.: PCT/FR03/02730

§ 371 (c)(1),
(2), (4) Date: May 16, 2005

(87) PCT Pub. No.: WO2004/028236

PCT Pub. Date: Apr. 8, 2004

(65) Prior Publication Data

US 2005/0229572 A1    Oct. 20, 2005

(30) Foreign Application Priority Data

Sep. 26, 2002    (FR) .................................. 02 11914

(51) Int. Cl.
*A01B 15/00*    (2006.01)
*A01B 23/00*    (2006.01)

(52) U.S. Cl. ...................................... 172/123; 172/548

(58) Field of Classification Search ................. 111/135, 111/137; 172/21, 22, 239, 540, 541, 544, 172/551, 556, 662, 705, 710, 711, 42, 44, 172/247, 438, 548, 118, 122–125; 56/256, 56/255, 295, 320.1, 320.2

See application file for complete search history.

(56) References Cited

U.S. PATENT DOCUMENTS

| | | | |
|---|---|---|---|
| 2,244,099 A | 6/1941 | Chase | |
| 3,734,197 A | 5/1973 | Zehrung, Jr. | |
| 3,859,777 A | 1/1975 | Doering | |
| 5,623,996 A | 4/1997 | Postema | |
| 7,331,402 B2 * | 2/2008 | Dairon et al. ................ | 172/123 |

FOREIGN PATENT DOCUMENTS

| | | |
|---|---|---|
| CH | 465 297 | 11/1968 |
| EP | 0 861 579 | 9/1998 |

* cited by examiner

*Primary Examiner*—Robert E Pezzuto
(74) *Attorney, Agent, or Firm*—Ladas & Parry LLP

(57) ABSTRACT

A device for fixing blades to plates which are rotationally integral with a rotary shaft and an agricultural machine fitted with the device. The device is characterized in that the flanks of each plate are cut and embodied such that they can receive in an interlocking matter and radially retain a planer additional part acting as a supporting leg for a blade and in that the end plates are axially and jointedly packed against each other in order to lock the blades to the respective end plates. The invention can be used in agricultural machines.

25 Claims, 10 Drawing Sheets

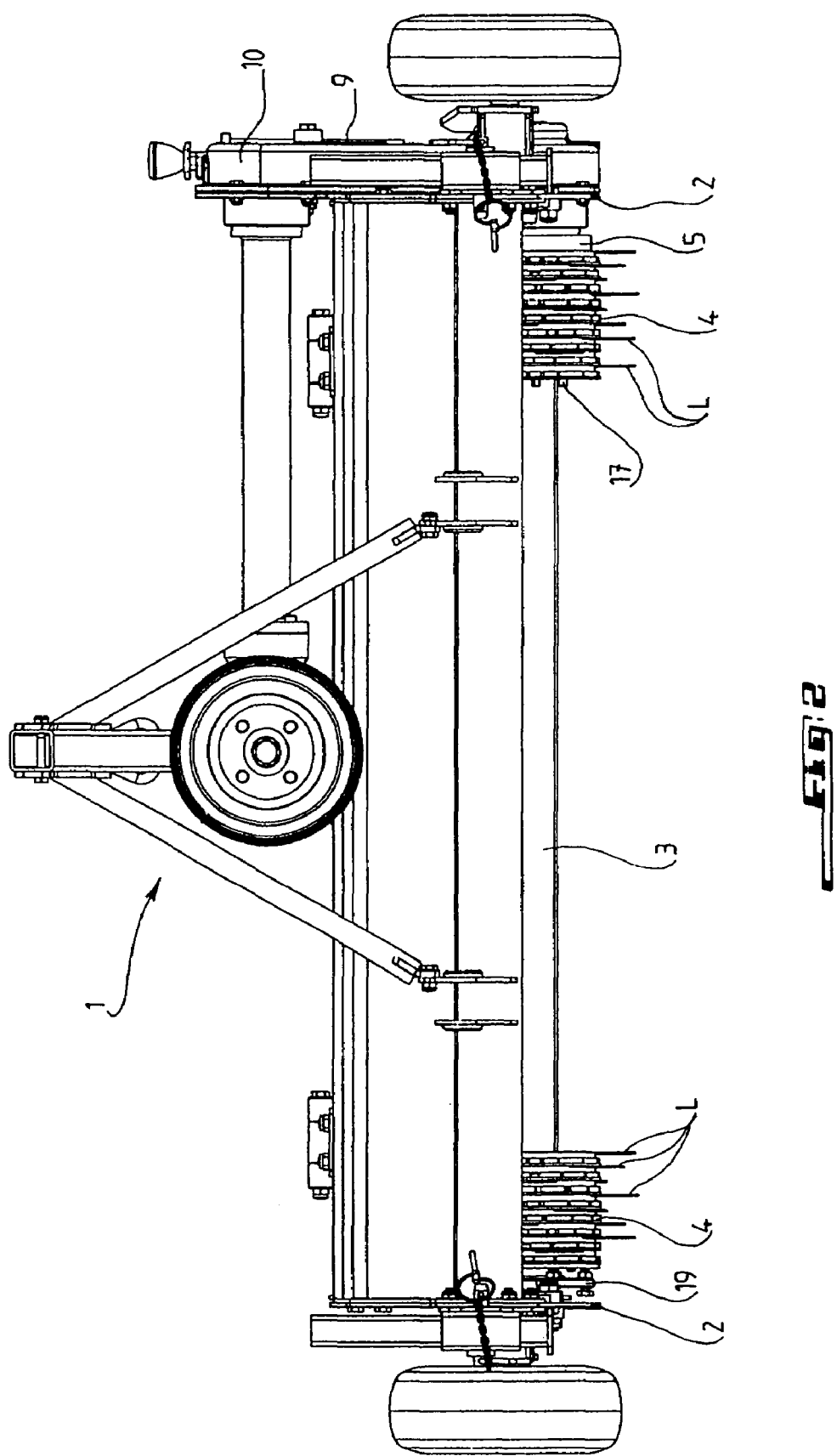

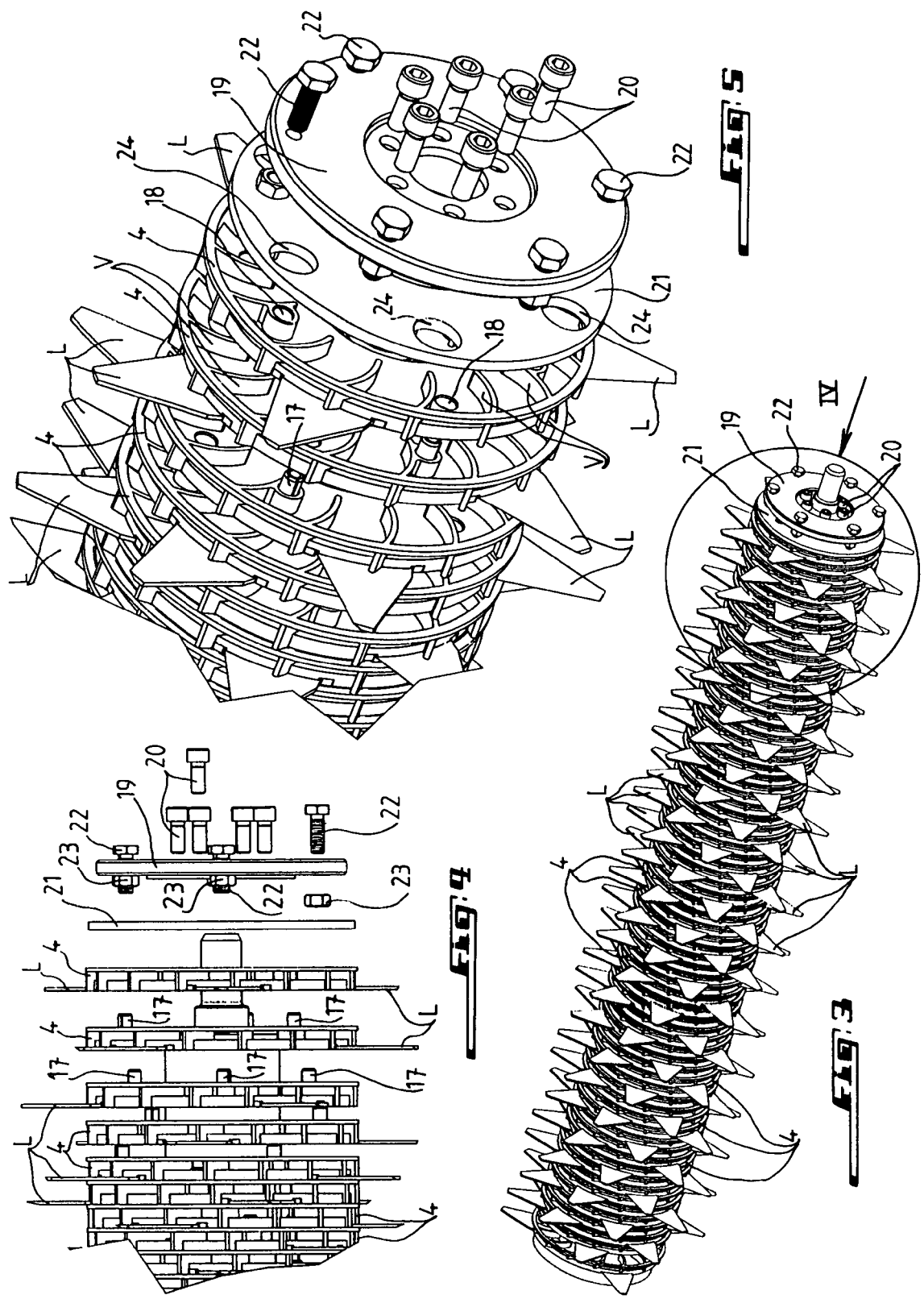

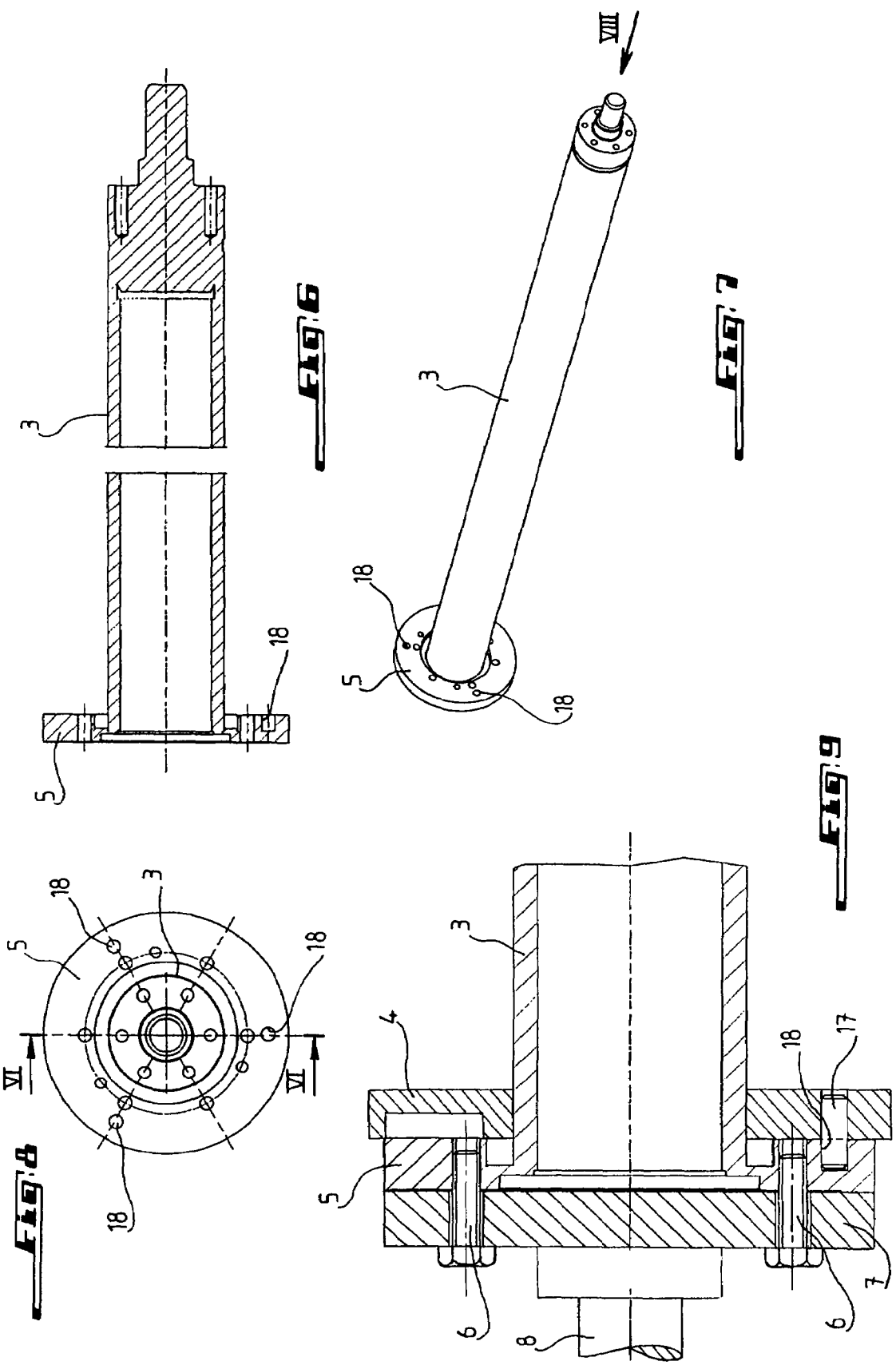

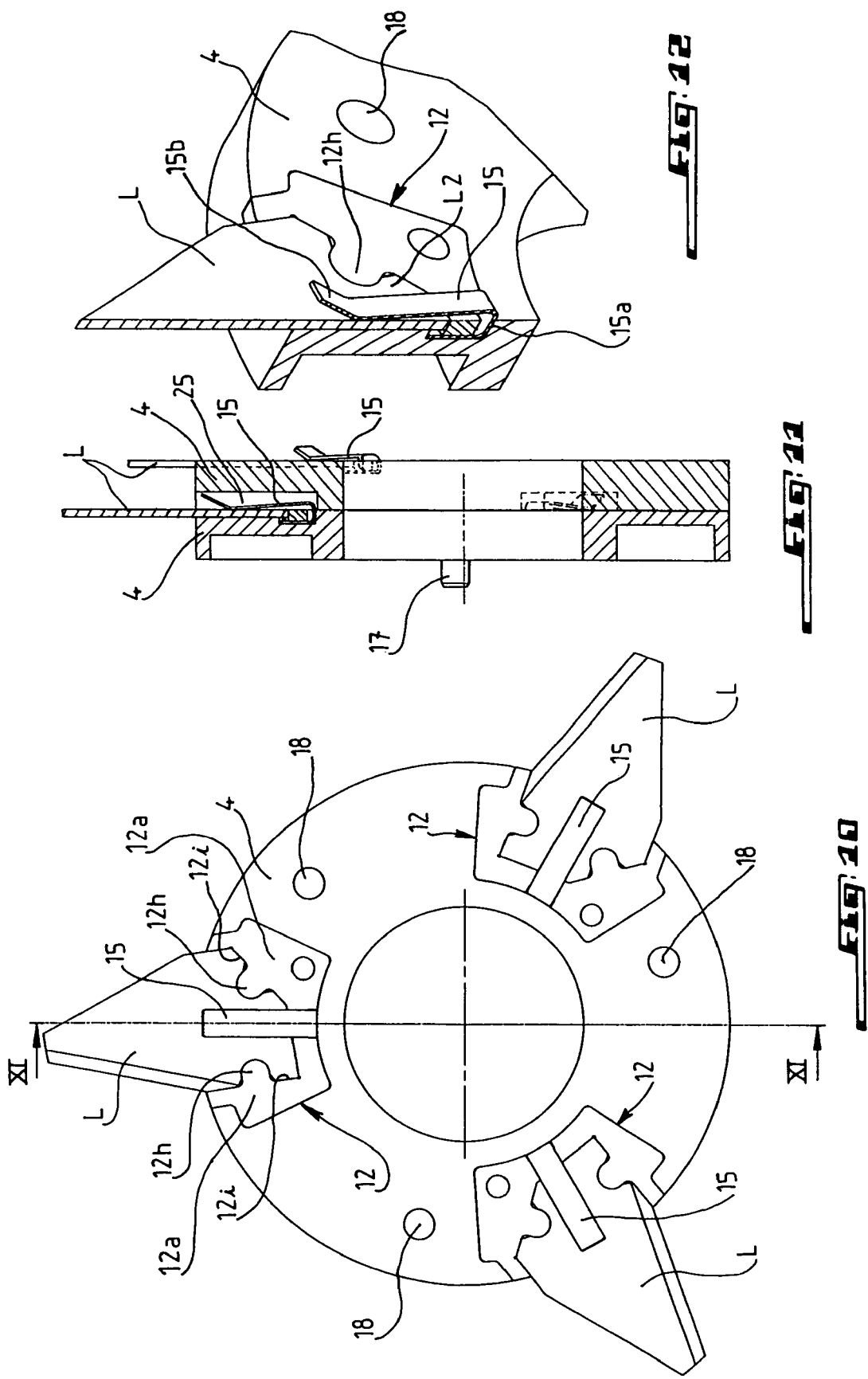

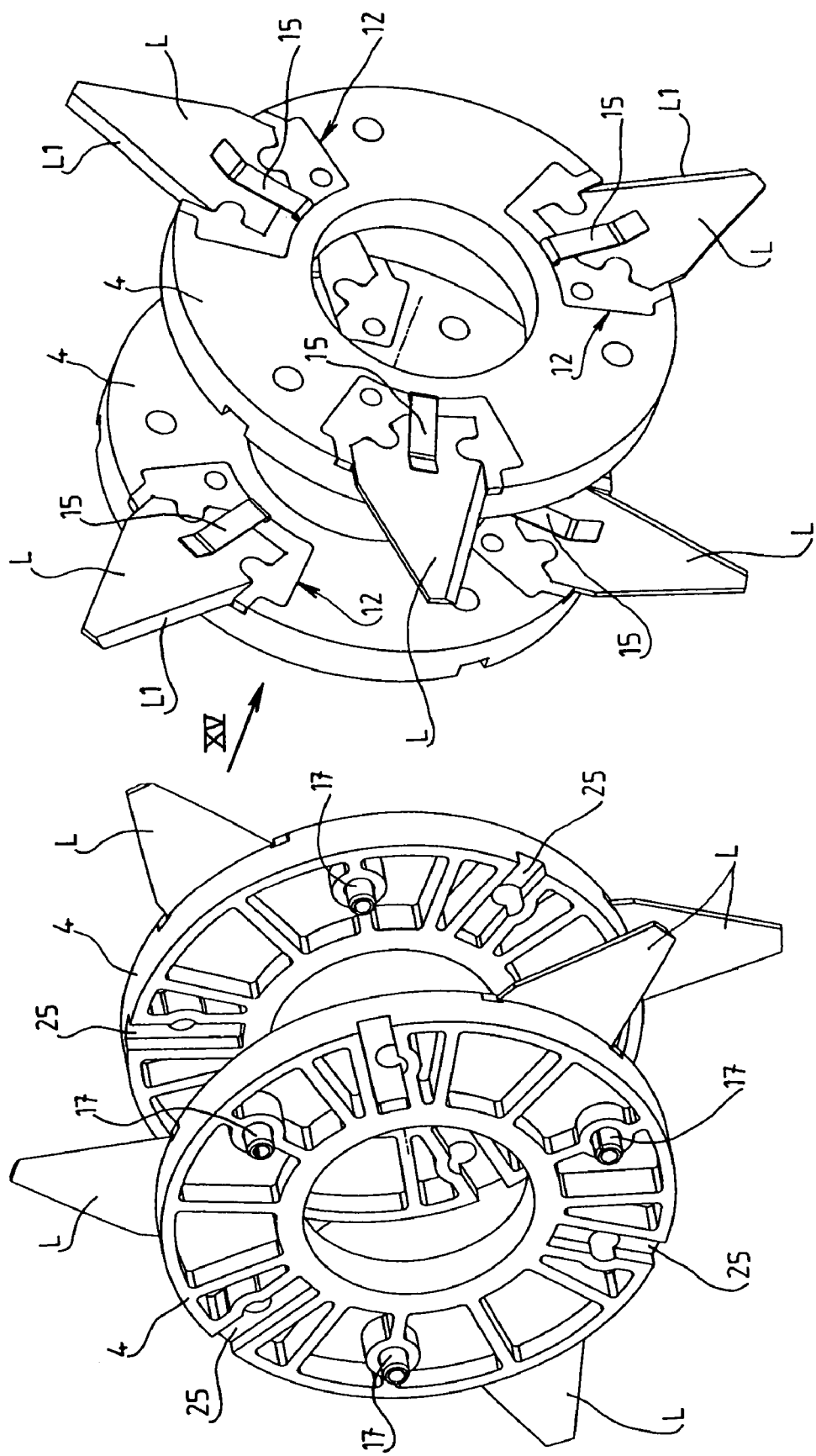

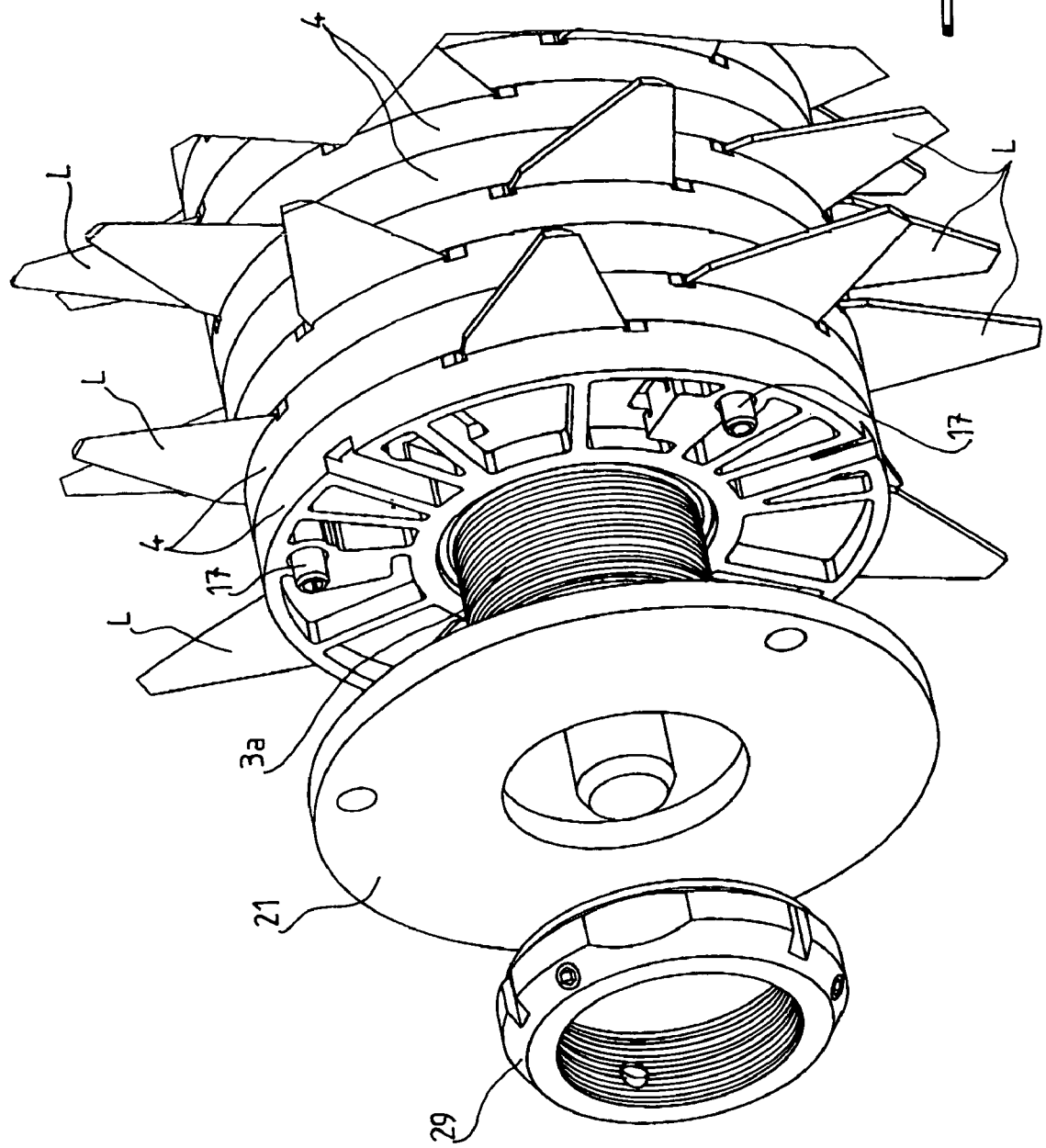

DEVICE FOR FIXING BLADES TO END PLATES WHICH ARE ROTATIONALLY INTEGRAL WITH A ROTARY SHAFT AND AGRICULTURAL MACHINE FITTED WITH SAID DEVICE

FIELD OF THE INVENTION

The invention relates to a device for fixing blades or similar elements to plates mounted transversely on a rotary shaft and being rotationally integral therewith.

It is applied in particular to an agricultural machine, such as a harrow, fitted with a blade-carrying rotary shaft with plates.

DESCRIPTION OF THE PRIOR ART

Such a device is known in which the plates are welded transversely to a rotary shaft and the blades are fixed to the plates, while projecting beyond them, by mounting bolts, usually two mounting bolts for each blade fixed to an plate.

According to this known fixing device, the changing of the blades, which are subject to wear, is tedious because at least two bolts must be loosened to remove each blade from its plate. Moreover, the mounting bolts are arranged so as to extend transversely to the plates, in such a way that the effort applied by the blades on the mounting bolts, especially while working the ground, can cause these bolts to shear.

Also known is a fixing device according to which the blade support plates are rotationally integral with the rotary shaft, and can be removed by sliding them along said shaft. However, changing the blades, for example those that are integral with an intermediate plate situated between two adjacent plates, requires the disassembly of the rotary shaft from the frame of the machine and the removal of all plates until reaching the plate holding the blades to be changed. This is not only tedious, but also takes a great deal of time.

SUMMARY OF THE INVENTION

A purpose of the present invention is to propose a device for fixing blades or similar elements that allows the blades to be removed and replaced quickly and easily, while still having a relatively simple structure.

Hence, a purpose of the invention is a device for fixing blades or similar elements to plates mounted transversely on a rotary shaft and being rotationally integral therewith, the blades projecting beyond the plates, and which is characterized in that each plate has at least one cut-out made in one of the flanks of the plate opening out laterally and at the periphery of the plate and embodied such that they can receive in an interlocking manner and radially retain a planar additional part acting as a support foot for a blade so that the outside lateral face of the part forming a support foot is flush with the corresponding outer face of the flank of the plate, and in that the plates are mounted one after the other on the rotary shaft and axially and jointedly packed against each other by axial tightening means allowing the successive flanks of the plates opposite to the flanks each of which has at least one cut-out, to be forced against these latter flanks and against the parts forming support foot of the blades to completely lock them in their respective cut-outs.

The axial tightening means can be loosened in a controlled way to allow an axial separation along the rotary shaft between adjacent plates by a given value and the lateral and radial removal of one of the blades from its cut-out, between two separated adjacent plates.

The axial tightening means include an end plate fixed by flanging to one end of the rotary shaft and transversely thereto, an axial thrust plate adjacent to the end plate and slidably mounted on the rotary shaft, and means integral with the end plate that exert on the thrust plate an axial effort forcing together the blade support plates held axially at the opposite end of the rotary shaft by a drive plate of the shaft that is transversely integral therewith.

The abovementioned means include several screws passing through the end plate, being regularly spaced coaxially to the rotary shaft and secured to the end plate in an axially adjustable position so that their free ends are pressed against the adjacent face of the thrust plate to exert upon said thrust plate the specific axial effort to tighten the blade support plates against each other, the screws being able to be loosened and moved transversely at the end plate to allow the axial separation between adjacent blade support plates.

The thrust plate includes several regularly spaced through-holes that can be lined up, after a slight loosening of the thrust screws, to face the free ends of the thrust screws by rotating the plate a specific angle value relative to the rotary shaft to allow the plate to be brought axially to a stop relative to the end plate so that the axial separation between adjacent blade support plates appreciably corresponds to the thickness of the thrust plate.

Each thrust screw is secured to the thrust plate by a nut and lock-nut assembly situated between the thrust plate and the end plate.

The blades are fixed to their respective support plates by being angularly offset relative to each other from one plate to the next so that the blades are distributed in a helical configuration along the rotary shaft.

Preferably, each plate has three lateral cut-outs for receiving respectively three blades placed at a 120° angle relative to each other.

The blade support plates are made rotationally integral with each other by pins transversely integral with the plates, being arranged concentrically to the rotary shaft and engaging respectively in the holes of the adjacent plates arranged concentrically to the rotary shaft.

Advantageously, each plate has three regularly spaced pins projecting from the side of the plate opposite to the one having at least one blade and engaging respectively in three holes in the adjacent plate situated on the side opposite to the one having at least one blade of the adjacent plate.

The pins of a plate are angularly offset relative to the opposite pins of the adjacent plate so that the blades are angularly offset from each other along the rotary shaft.

The plate adjacent to the drive plate is rotationally integral with this plate by pins integral with the plate, preferably three in number, arranged concentrically to the rotary shaft and projecting from the same side of the plate and engaging respectively in the holes made in the drive plate concentrically thereto.

Each lateral cut-out of a plate extends in a plane parallel to the flank of the plate, opening out laterally from this flank, and has a lower support edge of the end of the support foot of a blade and two circumferentially spaced side edges extending through the plate above the lower edge while forming a specific angle to each other and serving as support respectively for the two opposite sections of the part acting as the support foot of the blade, each lateral edge of a cut-out having a mounting boss that engages in a conjugate recess of the support foot of the blade to radially hold the latter to the respective plate.

The lateral edge of a cut-out has a slope that is different from its other lateral edge so as to constitute, with their respective mounting bosses, foolproof means of mounting the blade in its cut-out.

The lateral edges of the cut-out diverge toward the outer periphery of the corresponding plate.

Each cut-out of a plate is made directly in the flank of the plate.

According to a variation of preferred embodiment, each cut-out of a plate is made in a planar part inserted in a socket of conjugate shape made in the flank of the plate, the insert being generally U-shaped the side arms of which are pressed, by their opposite outer edges, respectively against the two radial edges of the socket and having at their inner edges respectively opposite the two mounting bosses directed toward each other, the two outer edges of the side arms of the insert having respectively two shoulders near the ends of the arms and each resting on one stop edge appreciably perpendicular to the corresponding radial edge of the socket where the insert is seated, the two stop edges being situated near the outer periphery of the plate on the same circumference between the two radial edges of the socket.

The two arms of the insert each terminate in a radial tenon seated in the socket and being supported on one side on one radial edge of the socket connecting to the associated stop edge so that the two radial edges facing each other define the opening that opens out into the outer periphery of the corresponding plate.

One of the mounting bosses of each insert projects outside the corresponding plate and serves as pivoting means of a blade when it is mounted in the insert.

Each blade support foot of a plate is held laterally in its cut-out when the plate is separated from the adjacent plate to remove a blade, by a radial strip one end of which is integral with the plate and the opposite free end elastically presses against the lateral face of the blade's support foot, the adjacent plate having a radial groove to seat the elastic strip.

According to one variation of embodiment, each blade's support foot of a plate is held laterally in its cut-out, when the plate is separated from the adjacent plate to remove a blade, by a magnet fixed at the bottom of the cut-out.

Advantageously, each insert is removably fixed in its socket on one side by an elastic hold-down tab and the other side by a holding block.

The blades project radially outside their respective plates.

Another purpose of the invention is an agricultural machine fitted with a rotary shaft with plates carrying blades, such as a harrow, characterized in that the blades are fixed to the plates by a device as defined above.

BRIEF DESCRIPTION OF THE DRAWINGS

The invention will be better understood, and other purposes, characteristics, details, and advantages will appear more clearly in the following description, with reference to the attached diagrammatical drawings provided solely by way of example illustrating one form of embodiment of the invention, and in which:

FIG. 2 is a view along arrow II of the machine of FIG. 1;

FIG. 3 is view in perspective of the rotary shaft removed from the machine and equipped with an attachment device according to the invention;

FIG. 4 is a front view, partly exploded and magnified, of the end circled as IV of the shaft of FIG. 3, showing the attachment device of the invention;

FIG. 5 is an exploded view in perspective of the part represented in FIG. 4;

FIG. 6 is a view in longitudinal cross section of the rotary shaft along line VI-VI of FIG. 8, fitted at one of its ends with a drive plate;

FIG. 7 is a view in perspective of the rotary shaft of FIG. 6;

FIG. 8 is an end view along arrow VIII of FIG. 7;

FIG. 9 is a magnified cross sectional view of the end of the rotary shaft connected to a drive plate of said shaft;

FIG. 10 is a front view of a plate having three blades on one of its sides;

FIG. 11 is a cross sectional view along line XI-XI of FIG. 10;

FIG. 12 is a magnified view in perspective with radial cross section of part of a plate and a blade held elastically on the side of the plate;

FIG. 14 is a view in perspective of two adjacent plates viewed from their sides carrying their respective blades; and FIG. 15 is a view in perspective of two plates along the arrow XV of FIG. 14.

FIG. 18 is a view in perspective representing a variation of embodiment of the means of packing the plates against each other.

DETAILED DESCRIPTION OF THE PREFERRED EMBODIMENT

The invention will now be described in the application to the ground harrowing machine, but it is obvious that it can be applied to any agricultural type of machine having rotary shaft with blades for working the ground, such as a rotary hoe or other.

Figure 1:
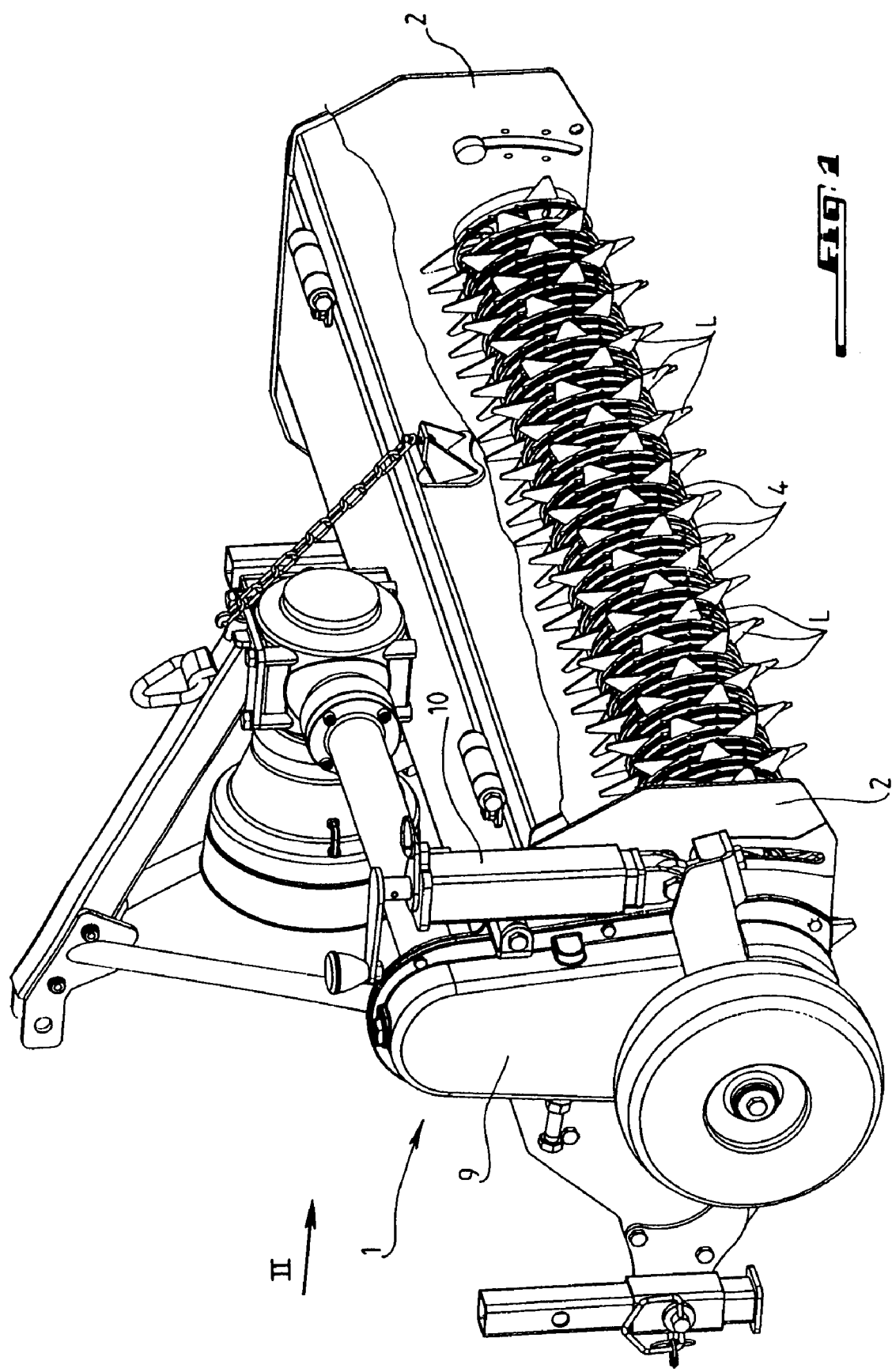
FIG. 1 is a three-quarters view in perspective of an agricultural machine equipped with a rotary shaft with plates carrying blades fixed thereto by an attachment device according to the invention.

With reference to FIGS. 1, 2, and 9, the ground harrowing machine comprises a rolling frame 1 that can be coupled to a drive device such as a tractor (not shown), and having two rigid side walls 2 between which a rotational shaft 3 is arranged transversely, driven from the tractor's power take-off.

The rotary shaft 3 carries along its full length plates 4 arranged transversely thereto and on which are fixed, projecting outward therefrom, blades or similar elements for working the ground, that is, in this case intended for aeration, decompacting, harrowing and dethatching the ground.

The shaft 3 has one of its ends integral with a radial drive plate 5 that is integral with said shaft and removably coupled, by means of attachment screws 6, to another drive plate 7 integral with the end of a drive shaft 8 mounted in rotation relative to the corresponding side wall 2 of the frame 1 and driven in rotation by a transmission means (not shown), such as a chain, housed in a side transmission housing 9 and driven by a motor shaft arranged parallel and above the rotary shaft 3, the motor shaft being driven by the tractor's power take-off. The plate 7 and the drive shaft can be made of a single piece.

The working depth of the blades L is adjustable by a jack screw 10, known as such.

Figure 13:
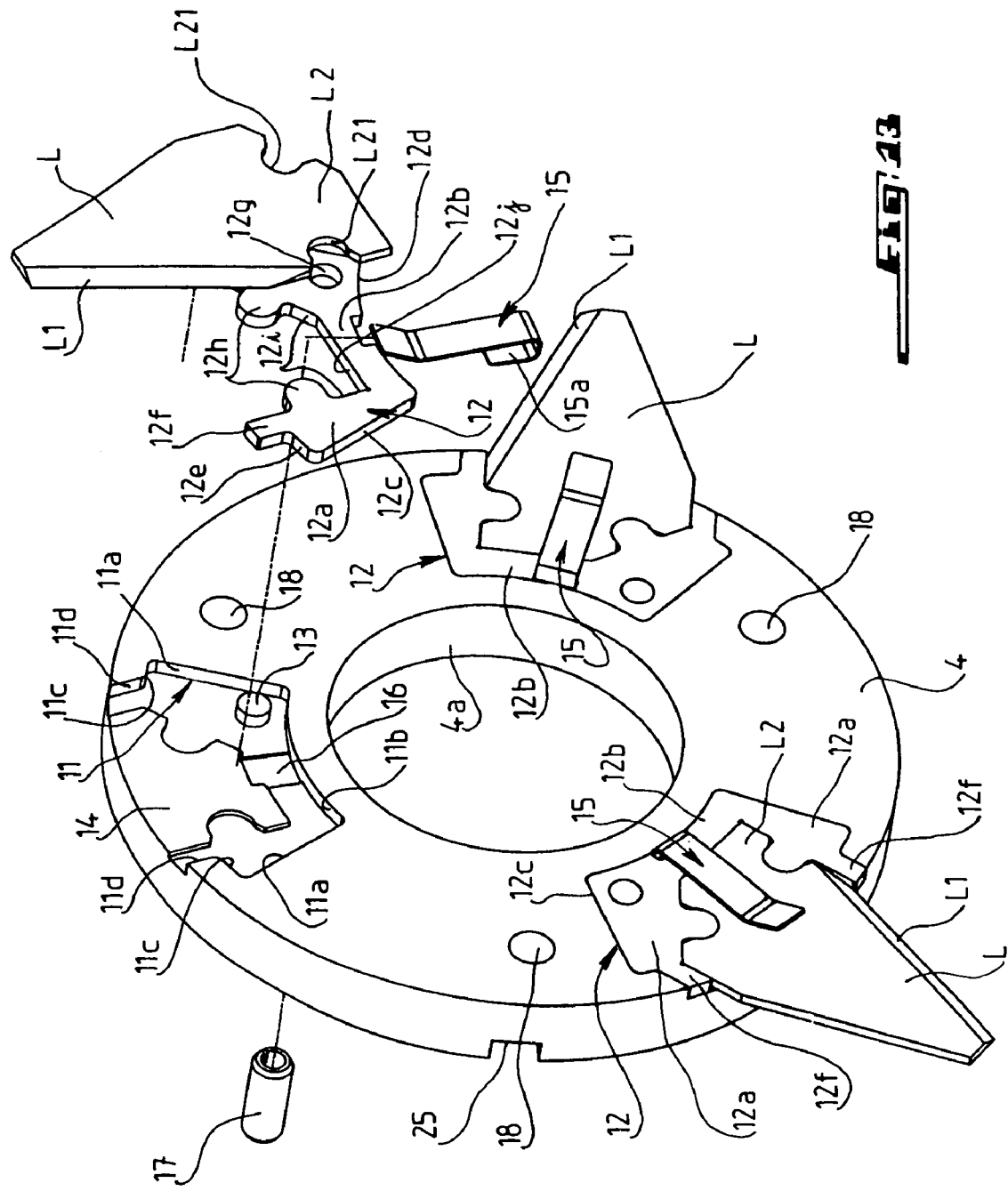
FIG. 13 is an exploded view in perspective of a plate and of the different means of interlocking and holding the blades in the flank of this plate.

As can be seen best in FIGS. 13 to 15, each plate 4 carries three working blades L extending radially in the same plane transversal to the rotary shaft 3 and angularly equidistant from each other by 120° with their cutting edges L1 situated on the same side as the direction of rotation of the blades. Furthermore, the blades L of a plate are angularly offset relative to the blades of an adjacent plate so that the blades L are configured as a helix all along the rotary shaft 3. Of course, each plate 4 can carry a different number of blades L.

According to the invention, each plate 4 has, in the case where it carries three blades L, three sockets 11, one of which is visible in FIG. 13, made in one of the flanks of the plate 4 extending in an inner plane parallel to this flank, on the one hand opening laterally and on the other hand radially at the outer periphery of the plate 4 on a portion of the circumference thereof. Each socket 11 is intended to receive a flat insert 12 having an outer shape conjugate to the socket 11 when pressed against the flat inner bottom of the socket 11 and a thickness equal to the depth of the socket 11 so that the outer lateral face of the insert 12 is flush with the flank of the plate 4, that is, in the same plane as this flank. Each insert 12 is generally U-shaped, the side arms 12a of which are flared above their connecting arm 12b toward the outer periphery of the plate 4 and their respective outer lateral edges 12c rest, in the assembled position of the insert 12 in the socket 11, respectively on two radial edges spaced circumferentially delimiting the socket 11 whose lower edge 11b, which connects the radial edges 11a situated near the circular central hole of the plate 4 through which the rotary shaft 3 passes, is arc-shaped to receive the arc-shaped outer lower edge 12d of the connecting arm 12b of the insert 12 in the assembled position of the latter in the socket 11. Thus, the insert 12 is held, on the one hand, in the circumferential direction by the radial edges 11a of this socket, and on the other hand in the radially internal direction by the arc-shaped lower edge 11b thereof. To hold each insert 12 in its socket 11 in the outer radial direction, the socket 11 has near the outer peripheral edge of the plate 4 two edges extending in the same circumference and directed toward each other by extending respectively the two radial edges 11a perpendicular to these edges so that each constitutes a stop 11c on which rests the corresponding outer edge forming a shoulder 12a of the insert 12 and extending its edge 12c perpendicular thereto.

Each arm 12a of an insert 12 has its free end terminating in a tenon shape 12f which rests on a radial edge 11d of the socket 11 connected to the corresponding stop edge 11c, the two radial edges 11d that face each other delimiting the opening of the socket opening into the outer periphery of the plate 4.

Facing each plate 4 as represented in FIG. 13, each socket 11 has the general shape of an isosceles trapezoid the small base of which is comprised of the arc-shaped edge 11b and the large base by the portion of outer peripheral edge of the plate 4 delimiting the opening of the socket 11.

Each insert 12 can be held while it is being mounted in the socket 11 by a cylindrical stud 13 integral with the bottom of the socket 11 and penetrating practically without clearance into a corresponding hole 12g of the insert 12.

Each insert 12 has two appreciably semicircular mounting bosses 12h that are integral respectively with the two facing internal edges 12i of the two arms 12a of the part 12 so that the two mounting bosses 12h are facing each other. Each mounting boss 12h extends perpendicularly from the corresponding inner edge 12i of the arm 12a of the insert 12 while being in the same plane as this arm, and the inner edge 12i of one of the arms 12a has a slope different from the inner edge 12i of the opposite arm 12a. As can be seen in FIG. 10, in the mounted position of each insert 12 in its socket 11, each internal edge 12i of the arm 12a of the insert 12 forms a straight line segment belonging to a chord of the circle constituting the outer periphery of the plate 4 when viewed face-on, the two chords holding the edges 12i being of different lengths.

Each socket 11 has at its bottom a part in relief 14 that can be seen in FIG. 13, of relatively small thickness and an outer contour shape conjugate with the inner profile of the insert delimited by the inner edges of the tenons 12f, the mounting bosses 12h, the inner edges 12i of the arms 12a and the inner edge 12j of the connecting arm 12b so that the insert 12 can be interlocked, like a puzzle, on the part in relief 14.

The tenons 12f, the mounting bosses 12h, the inner edges 12i, and the inner edge 12j of the insert 12 define between its arms 12a a cut-out for receiving part of a blade.

To that end, each working blade L has at its end opposite to its free end projecting from its respective plate 4 a part acting as support foot or heel L2 of a shape conjugate with the inner cut-out of the insert 12 so that the foot L2 can be interlocked into the insert 12 when said part has first been mounted in its socket 11. Thus, each foot L2 of a blade L has essentially two recesses L21 cut into the part L2 on either side thereof so that the two mounting bosses 12h of the part 12 can be engaged respectively in the two recesses L21 and one straight lower edge engaging on the straight edge 12j of the part 12. Thus, when the blade L is seated in its insert 12, said blade is radially held in the part 12. Moreover, in the mounted position of each blade L in its insert 12, the outer flat face of the part forming the support foot L2 is flush with the flat outer face of the insert 12 and the flank of the corresponding plate 4. Because the mounting bosses 12h and recesses L21 are asymmetrical, they constitute foolproof means of mounting the blades L in their respective inserts 12.

Each blade L can be held laterally in its insert 12 by an elastic device 15 preferably comprised of a strip of sheet steel having one end curved appreciably in a hook shape 15a one arm of which is comprised of the part of the strip 15 itself and is pressed against the outer face of the connecting arm 12b of the insert 12 and the other arm goes through a radial opening 16 in the bottom wall of the socket 11 in order to elastically hook on the back flank of the plate 4 opposite the front flank of this plate, as shown in FIG. 13. In this way, the elastic strip 15 is anchored to the plate 4 and the free end 15b of the strip 15 is slightly curved in the direction opposite the front flank of the plate 4 so that it elastically presses on the outer face of the support foot L2 of the blade L in order to hold it laterally in its insert 12.

The adjacent plates 4 are interlocked in rotation with each other by axial pins 17 integral with each plate and engaging respectively in axial holes 18 made in the adjacent plate 4. More specifically, each plate 4 has three pins 17 integral with the flank of the plate opposite the one supporting the work blades L, the pins 17 being situated in the same circumference and being angularly equidistant 120° from each other. Thus, in the mounted position of the plate 4 on the rotary shaft, 3, the pins project from the corresponding flank of the plate concentrically to said shaft. These pins 17 engage respectively in the corresponding axial holes 18 made in the flank of the adjacent plate 4 having the blades L. As can be better seen in FIG. 15, the pins 17 of a plate 4 are angularly offset relative to the pins 17 of the adjacent plate so that their respective blades L are angularly offset from each other so that the blades are configured helically along the rotary shaft 3.

The plates 4 are slid one after the other onto the rotary shaft 3 and jointedly packed against each other by axial packing means situated at the end of the rotary shaft 3 opposite the end having the drive plate 5 so that the flank of each plate 4 having the pins 17 is pressed flat onto the blades L and their inserts 12 so as to hold the blades in the inserts and also hold said inserts in their sockets 11. Of course, the axial packing means make it possible to hold the pins 17 in their corresponding holes 18 to link the plates in rotation with each other. In order to provide the rotational drive of the plates 4 by the rotary shaft 3, the last plate 4 adjacent to the drive plate 5 and not having a blade on its flank opposite this plate, also has axial pins 17 engaging respectively in the holes 18 made in the plate 5 to link the latter plate in rotation to the plates 4. Of course, the plate with blades that is adjacent to the last plate 4 is linked in rotation to said last plate 4 by the pins 17 as for the other plates.

The axial means of packing the plates 4 against each other include a radial plate 19 mounted by attachment screws 20 to the end of the rotary shaft 3 opposite to the drive plate 5, an axial thrust plate 21 slidably mounted on the shaft 3 and interposed between the end plate 19 and the first support plate 4 of blades L, and several screws 22 passing through the plate 19 concentrically to the shaft 3 while being regularly spaced circumferentially on the plate 19 and secured to the plate 19 so that the free ends of the screws 22 are against the adjacent lateral face of the plate 21 to exert the specific axial tightening force on the plates 4 supporting blades L. Each screw 22 is attached to the plate 19 by a nut and locknut assembly 23 situated between the plate 19 and the thrust plate 21 and which can be loosened to allow the screw 22 to be unscrewed in a direction opposite to the thrust plate 21 in order loosen the support plates 4 of blades L by a specific axial separation value between adjacent plates 4. Preferably, the thrust plate 21 has regularly spaced holes 24 equal in number to the screws 22 and normally angularly offset relative to the latter when the packing means axially lock the plates 4 against each other. By slightly loosening the screws 22 in the opposite direction to the thrust plate 21, said thrust plate can be manually turned on the shaft 3 to line the holes 24 up with the screws 22 and move the plate 21 toward the end plate 19 so that two adjacent support plates 4 of blades L can be axially separated from each other along the shaft 3 by an amount appreciably equal to the thickness of the thrust plate 21. To do this, two of the diametrically opposite screws 22 that do not act as axial thrust screws of the plate 21 are each preadjusted and set by a nut-locknut assembly 23 in a relative position such that the plate 21 can come to a stop on these two screws after a slight loosening of thrust screws by an amount allowing the separation of adjacent plate 4 by a value corresponding approximately to the thickness of the plate 21. Of course, each hole 24 of the plate 21 has a diameter greater than the dimensions of the nut-locknut assemblies 23.

The plates 4 with blades L are held locked against each other by packing means provided by the drive plate 5 on which is pressed the last plate 4 opposite the packing means.

To make it possible to pack flank against flank of two adjacent plates 4 without being hindered by the elastic strips 15 projecting from the flank of the plate 4 carrying the blades L, the plate 4 adjacent to the next plate 4 has in its flank contacting the flank with blades L of the other plate radial grooves 25 in which the respective strips 15 are seated.

When it is necessary to change the worn blades L, the user has only to slightly loosen the thrust screws 22, turn the thrust plate 21 to line up the through-holes 24 with the thrust screws 22 and separate two adjacent plates 4 where the blades to be changed are located, to allow the lateral removal of these blades from their inserts against the spring force of these elastic strips 15 and the radial removal of the blades from between the two adjacent plates 4.

Replacing worn blades with new blades is accomplished by radially inserting the new blades between the corresponding two adjacent plates 4 and then by inserting laterally, that is, in a direction parallel to the rotary shaft 3, each new blade into the corresponding insert 12, the mounting direction of each blade being achieved correctly by the foolproof means comprised of two asymmetrical mounting bosses 12h of the insert 12 being inserted respectively into the two asymmetrical recesses L21 of the foot L2 of the blade L. The radial insertion of each blade L is facilitated by the curved end 15b of the elastic strip 15 which then holds the blade L in the insert 12 before the plates 4 are tightened against each other.

Once the worn blades have been replaced by the new ones, the user moves the thrust plate 21 on the shaft 3 toward the drive plate 5 in order to bring the plates 4 in contact with each other, turns the plate 21 on the shaft 3 by an angle value to allow the through-holes 24 to line up facing the thrust screws 22, lightly retightens said screws and locks them in their position exerting the axial thrust of the plates against each other to ensure that the blades are held on the plates.

The operations of removing worn blades from their respective plates and replacing them with new blades is done quickly and simply without removing the rotary shaft 3 from the frame 1 of the machine.

Figure 16:
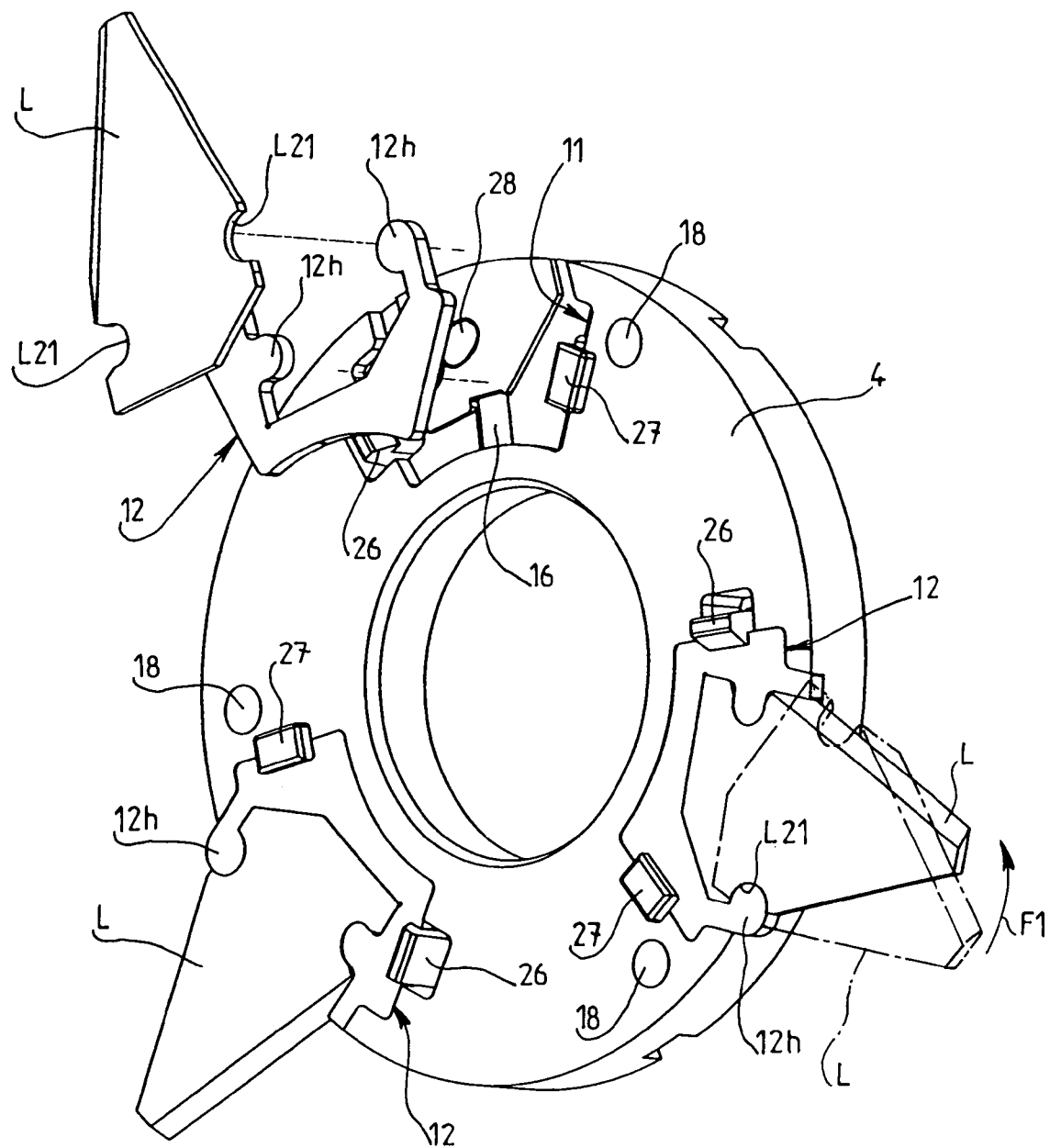
FIGS. 16 and 17 are exploded views similar to FIG. 13 and representing respectively two variations of embodiment.

According to the form of embodiment shown in FIG. 16, each insert 12 has one of its mounting bosses 12h projecting radially at least partially outside the periphery of the plate 4 in order to allow the mounting of a new blade L by engaging its corresponding recess L21 against the mounting boss 12h as shown by the dashed lines in FIG. 16, and by pivoting the blade L around the mounting boss 12h in the direction indicated by the arrow F1 until the blade L is locked in position in the insert 12. This mounting of the blade L by pivoting around the mounting boss 12h of the insert 12 further facilitates the insertion of the new blades into their respective inserts once the plates have been axially separated from each other.

FIG. 16 also shows that each insert 12 is removably held in its socket 11 by a tab 26 with hook-shaped curved end, integral with the corresponding plate 4 while projecting perpendicularly from its corresponding face and elastically deformable in a direction appreciably perpendicular to the corresponding radial edge 11a of the socket 11 to allow the insert 12 to be snapped into this socket. Each elastic tab 26 can be produced in a single piece with the plate 4 when the latter is produced from a plastic material. The insert 12 is held in its socket 11 not only by the hook-shaped end of the tab 26 pressed against the corresponding edge of the insert 12, but also by a small parallelepiped block 27 integral with the corresponding face of the plate 4 while projecting from said plate and pressed against the insert 12. The mounting of each insert 12 in its socket 11 is accomplished by inserting one of the sides of the insert 12 beneath the block 27 and snapping the other side of the insert 12 down into the socket 11 under the retaining tab 26. Each block 27 can be produced in a single piece, by molding, with the plate 4 when the latter is produced from a plastic material and the adjacent plate obviously has cavities to receive the elastic tabs 26 and blocks 27 when the plates are tightened against each other.

FIG. 16 also shows the presence of a small magnet 28 fixed to the bottom of each socket 11 to make it possible to hold the corresponding metal blade L when the plates are loosened and axially moved away from each other during a change of blades.

Each magnet 28 can be comprised of a small cylindrical bar projecting from the back of the plate 4 with respect to the bottom of the socket 11 for indexing the plate 4 relative to the adjacent plate by engaging in an axial hole of the adjacent plate like the pin 17. Thus, the projecting parts of the magnets 28 can replace the pins 17 to accomplish the same function as the latter.

The form of embodiment of FIG. 16 thus allows the blades L to be easily mounted and removed from their inserts 12, and the inserts can be changed in case of wear simply by manually separating each elastic tab 26 from the corresponding edge of the insert after having loosened the plates 4 from each other.

Figure 17:
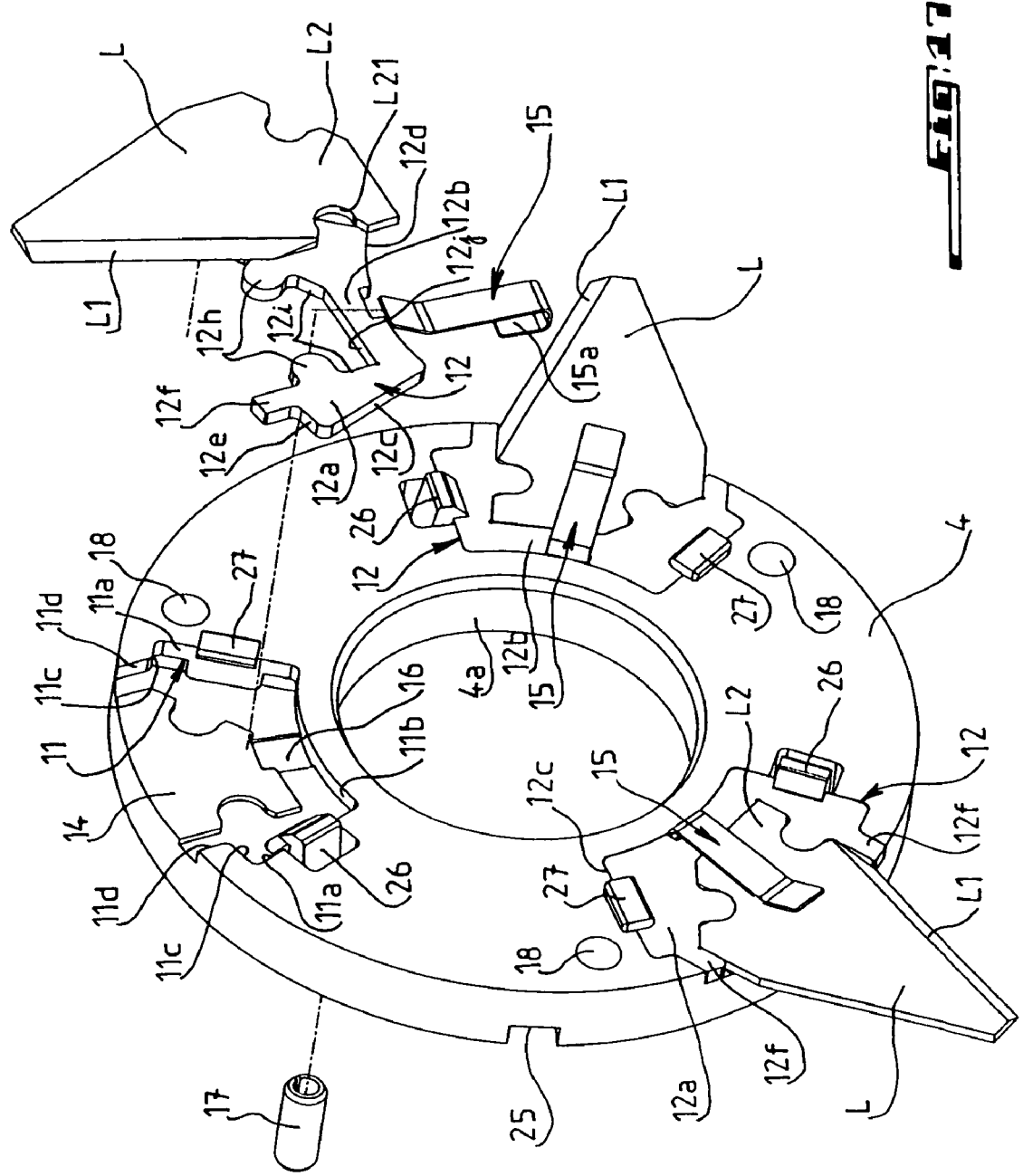

FIG. 17 generally corresponds to FIG. 13 particularly with respect to holding the blades L in their respective inserts by the strips 15 and each insert 12 is held in its socket 11 by the elastic tab 26 and the block 27 as in FIG. 16.

Various modifications can be made to the device described above for attaching blades to their respective plates without going beyond the scope of the present invention. Thus, each cut-out for receiving a blade L made in the insert 12 can be formed directly in the flank of the plate 4, therefore without the presence of an insert. Each plate 4 has been represented as having a solid flank on the blades side and a hollow flank on the opposite side, but both flanks of this plate can be solid or hollow. The advantage of providing plates with hollow flanks as shown particularly in FIG. 5 is to allow good ventilation of the plates and blades assembly when the machine is in use, especially when the hollows are defined for ventilator vanes V. The blades L are represented as being planar and extending radially outside their support plates, but it is possible to provide blades for which the parts forming the foot L2 remain flat to ensure that they are held in their respective cut-outs between adjacent plates pressed against each other and the blade with its cutting edge would be sloped with respect to the plane of the part forming the foot, depending on the type of machine for working the ground. Finally, instead of the indexing pins 17, it is possible to provide at least one mounting boss, preferably three in number, integral on the face of each plate 4 opposite the face having the blades projecting from this opposite face and being able to engage in a recess of conjugate shape of the face of the adjacent plate. The mounting boss or bosses for indexing the plates to each other can be produced in a single piece by molding when the plates are of a plastic material.

The invention claimed is:

1. Device for fixing blades to support plates mounted transversely on a rotary shaft and being rotationally integral therewith, the blades projecting beyond the plates, wherein each plate has at least one cut-out made in a flank of the plate opening out laterally at the periphery of the plate and shaped to receive in an interlocking manner and to radially retain a complementary flat part of a blade support foot so that a outside lateral face of the flat part of the blade support foot is flush with a corresponding outer face of the flank of the plate, and wherein the plates are mounted in a line on the rotary shaft and tightened axially and jointly against each other by axial tightening means allowing a flank of a plate positioned adjacent to another flank of another plate, each of which has at least one cut-out, to be forced against each other and against the flat parts of the blade support feet of the blades to completely lock the support feet in their respective cut-outs.

2. Device according to claim 1, wherein the axial tightening means can be loosened in a controlled way to allow an axial separation along the rotary shaft between adjacent plates by a given value and the lateral and radial removal of one of the blades from the cut-out of the flank of the plate, between two separated adjacent plates.

3. Device according to claim 1, wherein the axial tightening means include an end plate fixed by flanging to one end of the rotary shaft and transversely thereto, an axial thrust plate adjacent to the end plate and slidably mounted on the rotary shaft, and means integral with the end plate that exert on the thrust plate an axial effort forcing together the blade support plates held axially at the opposite end of the rotary shaft by a drive plate of the shaft that is transversely integral therewith.

4. Device according to claim 3, wherein the axial tightening means include several screws passing through the end plate, being regularly spaced coaxially to the rotary shaft and secured to the end plate in an axially adjustable position so that the free ends of the screws are pressed against the adjacent face of the thrust plate to exert upon said thrust plate the specific axial effort to tighten the blade support plates against each other, the screws being able to be loosened and moved transversely at the end plate to allow the axial separation between adjacent blade support plates.

5. Device according to claim 4, wherein the thrust plate includes several regularly spaced through-holes that can be lined up, after a slight loosening of the thrust screws, to face the free ends of the thrust screws by rotating the plate a specific angle value relative to the rotary shaft to allow the plate to be brought axially to a stop relative to the end plate so that the axial separation between adjacent blade support plates appreciably corresponds to the thickness of the thrust plate.

6. Device according to claim 4, wherein each thrust screw is secured to the end plate by a nut and lock-nut assembly situated between the thrust plate and the end plate.

7. Device according to claim 1, wherein the blades are fixed to their respective support plates by being angularly offset relative to each other from one plate to the next so that the blades are distributed in a helical configuration along the rotary shaft.

8. Device according to claim 1, wherein each plate has three lateral cut-outs for receiving respectively three blades placed at a 120° angle relative to each other.

9. Device according to claim 1, wherein the blade support plates are made rotationally integral with each other by pins transversely integral with the plates, being arranged concentrically to the rotary shaft and engaging respectively in the holes of the adjacent plates arranged concentrically to the rotary shaft.

10. Device according to claim 9, wherein each plate has three regularly spaced pins projecting from the side of the plate opposite to the one having at least one blade and engaging respectively in three holes in the adjacent plate situated on the side opposite to the one having at least one blade of the adjacent plate.

11. Device according to claim 9, wherein the pins of a plate are angularly offset relative to the opposite pins of the adjacent plate so that the blades are angularly offset from each other along the rotary shaft.

12. Device according to claim 9, wherein the axial tightening means include an end plate fixed by flanging to one end of the rotary shaft and transversely thereto, an axial thrust plate adjacent to the end plate and slidably mounted on the rotary shaft, and means integral with the end plate that exert on the thrust plate an axial effort forcing together the blade support plates held axially at the opposite end of the rotary shaft by a drive plate of the shaft that is transversely integral therewith, and wherein the plate adjacent to the drive plate is rotationally integral with this plate by pins integral with the plate, preferably three in number, arranged concentrically to the rotary shaft and projecting from the same side of the plate and engaging respectively in the holes made in the drive plate concentrically thereto.

13. Device according to claim 1, wherein each lateral cut-out of a plate extends in a plane parallel to the flank of the plate, opening out laterally from this flank, and has a lower support edge of the end of support foot of a blade and two circumferentially spaced side edges extending through the plate above the lower edge while forming a specific angle to each other and serving as support respectively for the two opposite sections of the part acting as the support foot of the blade, each lateral edge of a cut-out having a mounting boss that engages in a conjugate recess of the support foot of the blade to radially hold the latter to the respective plate.

14. Device according to claim 13, wherein the lateral edge of a cut-out has a slope that is different from its other lateral edge so as to constitute, with their respective mounting bosses, foolproof means of mounting the blade in its cut-out.

15. Device according to claim 13, wherein the lateral edges of the cut-out diverge toward the outer periphery of the corresponding plate.

16. Device according to claim 13, wherein each cut-out of a plate is made directly in the flank of the plate.

17. Device according to claim 13, wherein each cut-out of a plate is made in a planar part inserted in a socket of conjugate shape made in the flank of the plate the insert being generally U-shaped the side arms of which are pressed, by their opposite outer edges, respectively against the two radial edges of the socket and having at their inner edges respectively opposite the two mounting bosses directed toward each other, the two outer edges of the side arms of the insert having respectively two shoulders near the ends of the arms and each resting on one stop edge appreciably perpendicular to the corresponding radial edge of the socket where the insert is seated, the two stop edges being situated near the outer periphery of the plate on the same circumference between the two radial edges of the socket.

18. Device according to claim 17, wherein the two arms of the insert each terminate in a radial tenon seated in the socket and being supported on one side on one radial edge of the socket connecting to the associated stop edge so that the two radial edges facing each other define the opening that opens out into the outer periphery of the corresponding plate.

19. Device according to claim 17, wherein one of the mounting bosses of each insert projects outside the corresponding plate and serves as pivoting means of a blade when it is mounted in the insert.

20. Device according to claim 1, wherein each blade support foot of a plate is held laterally in its cut-out when the plate is separated from the adjacent plate to remove a blade, by a radial strip one end of which is integral with the plate and the opposite free end elastically presses against the lateral face of the support foot of the blade, the adjacent plate having a radial groove to seat the elastic strip.

21. Device according to claim 1, wherein each support foot of a blade of a plate is held laterally in its cut-out, when the plate is separated from the adjacent plate to remove a blade, by a magnet fixed at the bottom of the cut-out.

22. Device according to claim 17, wherein each insert is removably fixed in its socket on one side by an elastic hold-down tab and the other side by a holding block.

23. Device according to claim 1, wherein the blades project radially outside their respective plates.

24. Agricultural machine fitted with a rotary shaft with plates carrying blades, wherein the blades are fixed to the plates by a device according to claim 1.

25. A device for fixing blades to plates mounted transversely on a rotary shaft and being rotationally integral therewith, the blades projecting beyond the plates, wherein each plate has at least one cut-out made in the flank of the plate opening out laterally at the periphery of the plate and shaped to receive in an interlocking manner and to radially retain a complementary flat part of the blade support foot so that a outside lateral face of the part of the blade support foot is flush with a corresponding outer face of the flank of the plate, wherein the plates are mounted in a line on the rotary shaft and tightened axially and jointly against each other by axial tightening means allowing the successive flanks of the plates opposite to the flanks each of which has at least one cut-out, to be forced against these latter flanks and against the parts of the blade support feet to completely lock the support feet in their respective cut-outs, and wherein each lateral cut-out of the plate extends in a plane parallel to the flank of the plate, opens out laterally from this flank, and has a lower support edge of the end of the support foot of a glad and two circumferentially spaced side edges extending through the plate above the lower edge while forming a specific angle to each other and service as support respectively for the two opposite sections of the part of the blade support foot, each lateral edge of a cut-out having a mounting boss that engages in a conjugate recess of the support foot of the blade to radially hold the latter to the respective plate.

* * * * *